(12) United States Patent
Huang et al.

(10) Patent No.: US 10,447,763 B2
(45) Date of Patent: Oct. 15, 2019

(54) DISTRIBUTED STORAGE METHOD AND SYSTEM

(71) Applicant: NANNING FUGUI PRECISION INDUSTRIAL CO., LTD., Nanning (CN)

(72) Inventors: Cheng-Yi Huang, New Taipei (TW); Chih-Wei Su, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 293 days.

(21) Appl. No.: 15/372,405

(22) Filed: Dec. 8, 2016

(65) Prior Publication Data

US 2018/0167439 A1 Jun. 14, 2018

(51) Int. Cl.
*H04L 29/08* (2006.01)
*G06F 3/06* (2006.01)
*G06F 16/182* (2019.01)

(52) U.S. Cl.
CPC .............. *H04L 67/06* (2013.01); *H04L 67/10* (2013.01); *H04L 67/1097* (2013.01); *G06F 3/067* (2013.01); *G06F 16/182* (2019.01)

(58) Field of Classification Search
CPC ..... H04L 67/10; H04L 67/1097; G06F 3/067; G06F 16/182
See application file for complete search history.

(56) References Cited

U.S. PATENT DOCUMENTS

| 5,583,995 | A | * | 12/1996 | Gardner | G06F 11/1076 348/E7.071 |
|---|---|---|---|---|---|
| 6,407,752 | B1 | | 6/2002 | Harnett | |
| 7,209,972 | B1 | * | 4/2007 | Ignatius | G06F 3/0613 370/431 |
| 7,293,145 | B1 | * | 11/2007 | Baird | G06F 11/1471 711/162 |
| 8,281,218 | B1 | * | 10/2012 | Ybarra | G06F 11/1004 714/763 |
| 9,183,065 | B1 | * | 11/2015 | Shanker | G06F 9/544 |
| 2005/0246510 | A1 | * | 11/2005 | Retnamma | G06F 11/1464 711/162 |
| 2010/0138544 | A1 | * | 6/2010 | Guo | H04L 67/14 709/227 |

(Continued)

FOREIGN PATENT DOCUMENTS

CN 103853613 A 6/2014
CN 104462324 A 3/2015

*Primary Examiner* — Lashonda T Jacobs
(74) *Attorney, Agent, or Firm* — ScienBiziP, P.C.

(57) ABSTRACT

The present disclosure recites a distributed storage method applied in a distributed file system, and the method including steps: splitting the original file into data blocks and storing in a data block queue; assigning multiple data nodes to form a first pipe to transmit a first data block from the data block queue, and when the first one of the data nodes in the first pipe have been written in the data block, assigning another multiple data nodes to form a second pipe to transmit a second data block from the data block queue; transmitting the pipes when the overall data nodes of the first and second pipes been written in the first and second data blocks. The present disclosure also provides a distributed storage system, and all of them can improve the transmission speed of the distributed file system.

10 Claims, 5 Drawing Sheets

(56) References Cited

U.S. PATENT DOCUMENTS

| | | | |
|---|---|---|---|
| 2012/0060018 A1* | 3/2012 | Shinde | G06F 9/544 |
| | | | 712/220 |
| 2012/0066470 A1* | 3/2012 | Fukuda | G06F 12/023 |
| | | | 711/171 |
| 2013/0246580 A1* | 9/2013 | Ozawa | H04L 67/1097 |
| | | | 709/219 |
| 2014/0172868 A1* | 6/2014 | Lin | G06F 16/245 |
| | | | 707/741 |
| 2014/0214760 A1* | 7/2014 | Bashyam | G06F 16/27 |
| | | | 707/613 |
| 2015/0312335 A1* | 10/2015 | Ying | H04L 67/1061 |
| | | | 709/201 |
| 2016/0119349 A1* | 4/2016 | Wang | H04L 63/10 |
| | | | 713/168 |
| 2016/0253362 A1* | 9/2016 | Zhuang | G06F 11/14 |
| | | | 707/692 |
| 2016/0274972 A1* | 9/2016 | Li | G06F 11/1088 |
| 2016/0335287 A1* | 11/2016 | Li | G06F 16/24568 |
| 2017/0031599 A1* | 2/2017 | Bowman | G06F 3/061 |
| 2018/0032478 A1* | 2/2018 | Felderman | G06F 17/2229 |
| 2018/0239549 A1* | 8/2018 | Zhang | G06F 16/00 |
| 2018/0288154 A1* | 10/2018 | Ghazaleh | G06F 11/1464 |

\* cited by examiner

DISTRIBUTED STORAGE METHOD AND SYSTEM

FIELD

The subject matter herein generally relates to data processing technology.

BACKGROUND

With the rapid development of network technology, distributed file systems have been widely used and developed. Current distributed file systems include Google File System (GFS), Hadoop Distributed File System (HDFS), a parallel file system (Lustre) and Ceph etc, and the architecture and basic principles of these distributed file systems are approximately the same. Although the transmission speed of a distributed file system is very fast, the distributed file system cannot be integrated into the large data transmission, which is growing in demand. The transmission speed of the distributed file system is mainly reflected in the transmission speed of the data storage.

BRIEF DESCRIPTION OF THE DRAWINGS

Implementations of the present technology will now be described, by way of example only, with reference to the attached figures, wherein.

DETAILED DESCRIPTION

Figure 1:
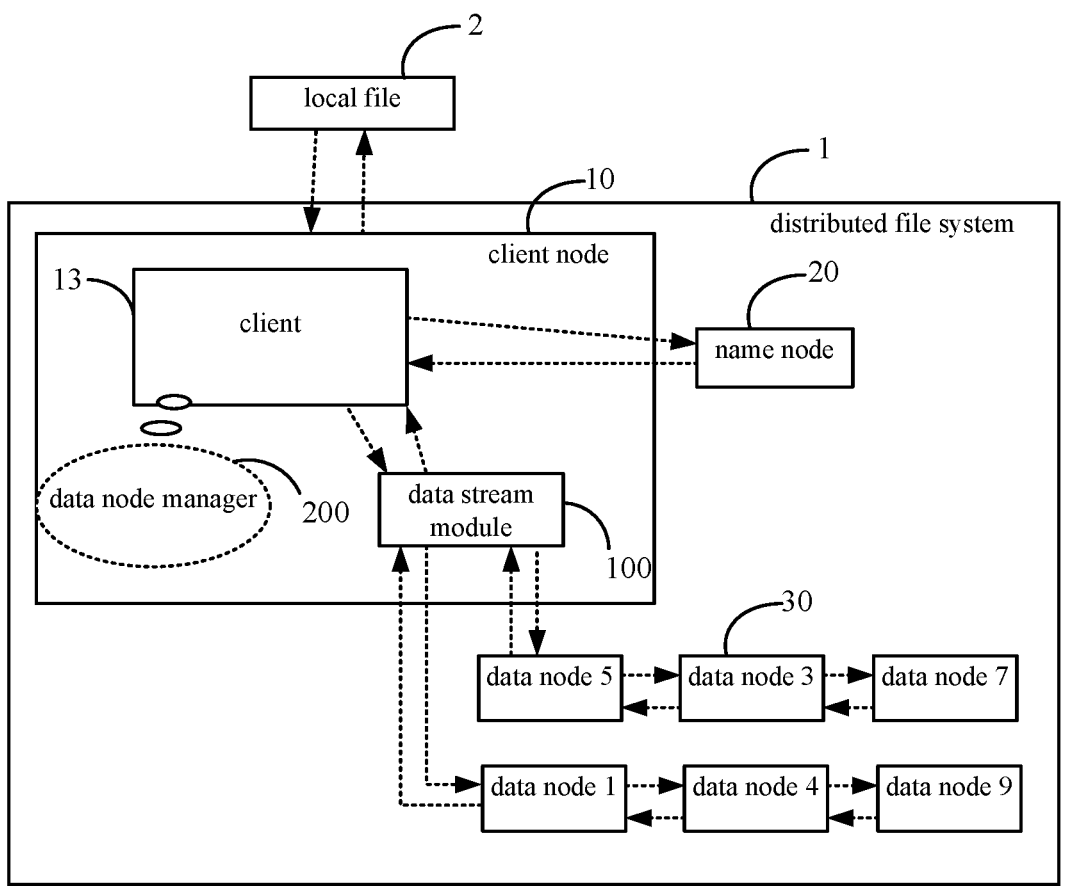
FIG. 1 illustrates a diagrammatic view of an exemplary embodiment of a distributed storage system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates a diagrammatic view of an exemplary embodiment of a distributed storage system. In this exemplary embodiment, the distributed storage system 1 stores the local file 2 to the target area of a distributed file system. The distributed storage system 1 includes a client node 10, a name node 20, and data node 30. The data node 30 is the general expression of the data node, and the data node is countable, such as one data node, multiple data nodes which are described in the present exemplary embodiment. The distributed file system includes GFS, HDFS, Lustre, and Ceph, and may also include any other distributed file systems with similar architecture. The name node 20 and the data node 30 are respectively located in a corresponding name node server and data node server. The data node 30 is used to load the data blocks of the local file 2 to the target area of the distributed file system. The name node 20 is used to control the data node 30 and also store the name of the local file 2.

The client node 10 includes a client 13 which is used controlled and operated by the user. The client 13 can be a PC (personal computer), a computer, or other electronic device with storing and processing functions. The client 13 creates a data stream module 100 and activates a data node manager 200 when performing a distributed storing process. The data stream module 100 is used to split the local file 2 into data blocks to meet the transmission requirements in the process of distributed storing. The transmission comprises writing transmission and read transmission.

The data node manager 200 communicates with the name node 20. Specifically, the data node manager 200 applies data nodes to the name node 20 according to the data blocks split by the data stream module 100. Then the data node manager 200 assigns the data nodes to the data stream module 100 to transmit the data blocks according to the data nodes characteristics (such as response speed).

Figure 2:
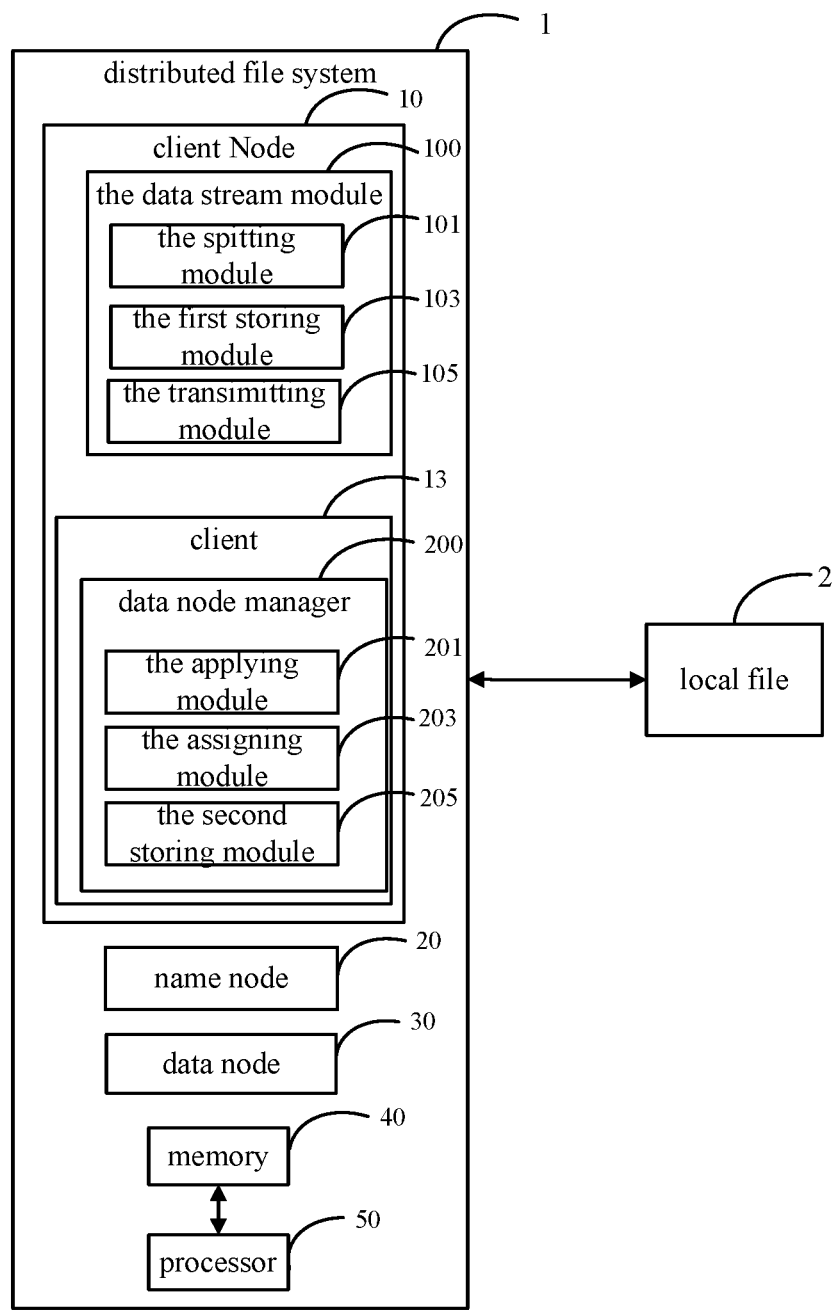
FIG. 2 illustrates a block diagram of an exemplary embodiment of functional modules of the distributed storage system.

FIG. 2 illustrates a block diagram of an exemplary embodiment of functional modules of the distributed storage system. The distributed storage system 1 includes the client node 10, the name node 20, and the data nodes 30. The client node 10 includes the data stream module 100 and the client 13. The data stream module 100 includes a splitting module 101, a first storing module 103, and a transmitting module 105. The client 13 includes the data node manager 200. The data node manager 200 includes an applying module 201, an assigning module 203, and a second storing module 205. The modules described in the present disclosure are configured to be executed by one or more processors (the exemplary embodiment of the processor 50). Each of the modules of the present disclosure comprises of computer programs to complete a specific function. This memory 40 stores the program information as well as other information of the distributed storage system 1.

Figure 3:
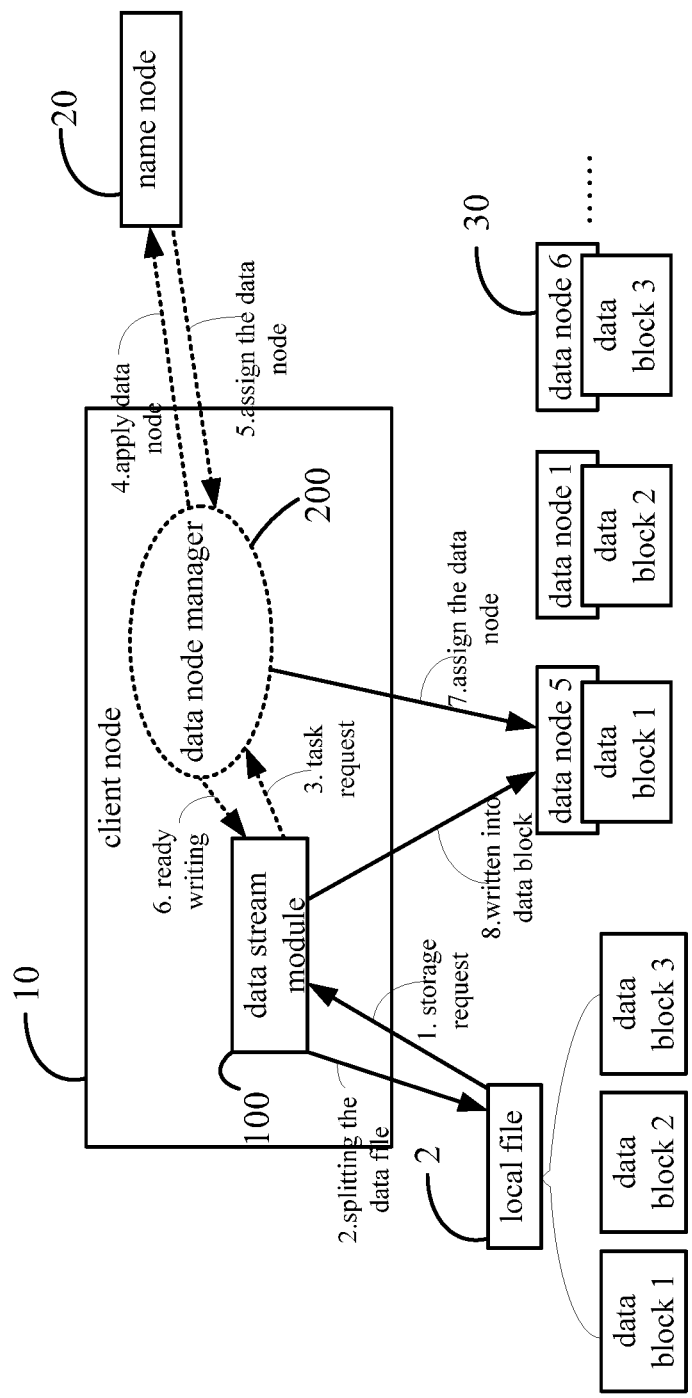
FIG. 3 illustrates a diagrammatic view of an exemplary embodiment of a data node distribution of the distributed storage system.
Figure 4:
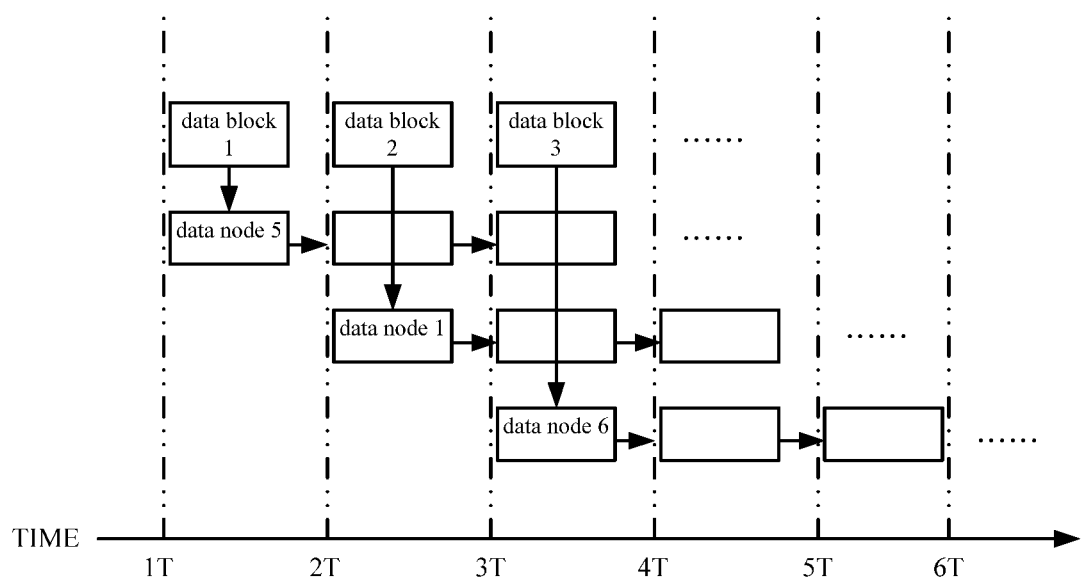
FIG. 4 illustrates a workflow of an exemplary embodiment of a pipeline transmission of the distributed storage system.

Referring to FIG. 3 and FIG. 4, the exemplary embodiment of the FIG. 2 will now be described in more detail. The splitting module 101 splits the local file 2 into data blocks according to a preset format and size after the distributed storage system 1 receive a storing request from the local file 2. Then the splitting module 101 stores the data blocks in the storing module 103 as a data block queue. The data block size is set to about 64 MB by default, and it can be set to the other sizes by the user. Generally, the data block size should be set more than about 64 MB in order to improve the transmission efficiency. Finally, the splitting module 101 sends a task request to the data node manager 200.

The applying module 201 applies the appropriate number of data nodes to the name node 20 after receiving the task request from the splitting module 101. Then the applying module 201 stores the data nodes allocated by the name node 20 in the second storing module 205. The number of the data nodes to be applied is determined by the number of data nodes in a pipe, the number of pipes transmitted simultaneously, the number of data blocks, and the probability of invalid data nodes, wherein the probability of invalid data nodes is counted according to the transmission record history which records the response time of each of the data nodes. The data nodes in the pipe will be released for reallocation when the transmission is completed. Thus, the number of the maximum number of the data nodes of the pipes transmitting simultaneously does not exceed the product of the number of data nodes in a pipe and the number of pipes transmitted simultaneously. In particular, the number of data nodes in the pipe is specified by the distributed file system, and the maximum number of pipes transmitted simultaneously is set according to the transmission bandwidth.

In the exemplary embodiment, the number of data nodes to transmit one data block in a pipe is 3. The number of the data blocks stored in the data block queue to be transmitted is exactly 100. In this example, the maximum number of data nodes transmitting simultaneously is 3*100 when the number of pipes used to transmit the data blocks simultaneously is larger than the number of data blocks stored in the data block queue. The maximum number of data nodes transmitting simultaneously is the product of the number of data nodes in a pipe and the number of pipes used to transmit the data blocks simultaneously when the number of pipes used to transmit the data blocks simultaneously is less than the number of data blocks stored in the data block queue. For example, the number of pipe transmitting simultaneously is 10, so that the maximum number of data nodes of the pipes transmitting at this time is 3*10 (the product of the number of blocks in a pipe and the number of pipes transmitting simultaneously).

Additionally, the number of the data nodes to be applied is also determined by the probability of invalid data nodes. In the exemplary embodiment, the number of data nodes to transmit one data block in a pipe is 3, and the number of the data blocks stored in the data block queue to be transmitted is 100. The number of pipes transmitting simultaneously is more than 100, and the probability of invalid data node is 30%. Therefore, the applying module 201 apply for 3*100/(100%−30%) data nodes and stores the data nodes in the second storing module 205.

Next, the assigning module 203 sorts the data nodes stored in the second storing module 205 as a range according to the response speed and the number of the data blocks stored in the data block queue and numbers the data nodes. Then the assigning module 203 assigns the data nodes sorted in the front of a certain interval of the range to each of the pipes as the first one of the data nodes in each of the pipes to transmit the data blocks stored in the data block queue.

As shown in Table 1, the assigning module 203 sorts and numbers the data nodes stored in the second storing module 205 as a range, and obtains the data nodes in the front of the certain interval of the range which were numbered 5, 1, 6, 2 etc.

TABLE 1

| data node | Response time |
|---|---|
| 5 | 50 ms |
| 1 | 100 ms |
| 6 | 200 ms |
| 2 | 200 ms |
| 8 | 250 ms |
| 10 | 300 ms |
| . . . | . . . |

Referring to FIG. 3, in the exemplary embodiment, the spitting module 101 splits the local file 2 into data block 1, data block 2, and data block 3 and then stores the data blocks in the data block queue. Then the spitting module 101 sends a request to the data node manager 200. According to the distributed file system rule, since the number of data nodes to transmit one data block in one pipe is preset to 3 and taking the probability of invalid data nodes is taken into consideration, so that the applying module 201 should apply extra 3 data nodes to transmit each of the data blocks. In particular, the number of the extra data nodes to be applied can be generated by the other rule in the other exemplary embodiment.

Therefore, the applying module 201 applies 18 (3*3+3*3) data nodes to the name node 20 according to the data block 1, data block 2 and data block 3 which stored in the data block queue, and then stores the data nodes applied in the second storing module 203. Then, to generate the numbers and response time shown in the Table 1, the assigning module 205 sorts the data nodes stored in the second storing module 203 according to the response speed, wherein the data nodes with the same response time are sorted randomly.

In the exemplary embodiment, the assigning module 205 assigns multiple data nodes to form a first pipe to transmit the data block 1, wherein the first one of the data node of the first pipe is selected from the front of a certain interval of the range sorted by the assigning module 205. Therefore, the assigning module 205 assigns the data node 5 (sorted in the front of the interval of 6 data nodes) to the first pipe as the first one of the data nodes to transmit the data block 1. The assigning module 205 also assigns the data nodes sorted outside the front of the interval of 6 data nodes to the first pipe as the second one and the third one of the data nodes randomly. Then the assigning module 205 sends the message of ready to writing to the data stream module 100 after the initial assignment.

The transmitting module 105 writes the data block 1 stored in the data block queue into the data node 5 after receiving the message of ready to writing from the assigning module 205. And the transmitting module 105 continue to writes the data block 1 into the second data node and the third data node of the first pipe after the block 1 is confirmed to be written into the data node 5. Simultaneously, the assigning module 205 assigns another multiple data nodes to form a second pipe to transmit the data block 2. The assigning module 205 assigns the data node 1 (sorted in the front of the interval of 6 data nodes) to the second pipe as the first one of the data nodes to transmit the data block 2, and assigns the data nodes sorted outside the front of the interval of 6 data nodes to the second pipe as the second one and the third one of the data nodes randomly.

In accordance with the above method, the transmitting module 105 writes the data block 2 into the data node 1, the second one and the third one of the data nodes of the second pipe. And the assigning module 205 continues to assign the data node 6 (sorted in the front of the interval of 6 data nodes) to the third pipe as the first one of data nodes to transmit the data block 3, and assigns the data nodes sorted outside the front of the interval of 6 data nodes to the third pipe as the second one and the third one of the data nodes randomly after the block 2 is confirmed to be written into the data node 1 in accordance with the same way.

The transmitting module 105 should to confirms it after writing the data blocks into the data nodes. And the transmitting module 105 determines the data node is invalid when the data node is confirmed failure to write into data block, and the transmitting module 105 discards the data node directly. Then the assigning module 205 assigns a new data node to replace the discarded data node. In particular, the assigning module 205 assigns the data node sorted in the front of the interval of 6 data nodes to replace the discarded data node when the discarded data node is the first one of data nodes of the pipes, and assigns the data node sorted outside the front of the interval of 6 data nodes to replace the discarded data node when the discarded data node is the second one and the third one of the data nodes of the pipes.

The transmitting module 105 transmits the pipes when the overall data nodes of the pipes have been written in the data blocks and completed the confirmation of writing. In the exemplary embodiment, the transmitting module 105 respectively writes the data block 1, the data block 2 and the data block 3 into the first one, the second one and the third one of the data nodes of the first pipe, the second pipe and the third pipe, and then transmit the pipes to the target area of the distributed file system. Thus, the first pipe, the second pipe and the third pipe loaded the data block 1, the data block 2 and the data block 3 were transmitted sequentially by the transmitting module 105. After the data block 1, the data block 2 and the data block 3 were transmitted to the target area of the distributed file system by this way, the transmitting module 105 extracts the data blocks and assembles the data blocks into the original file to store the file.

Figure 5:
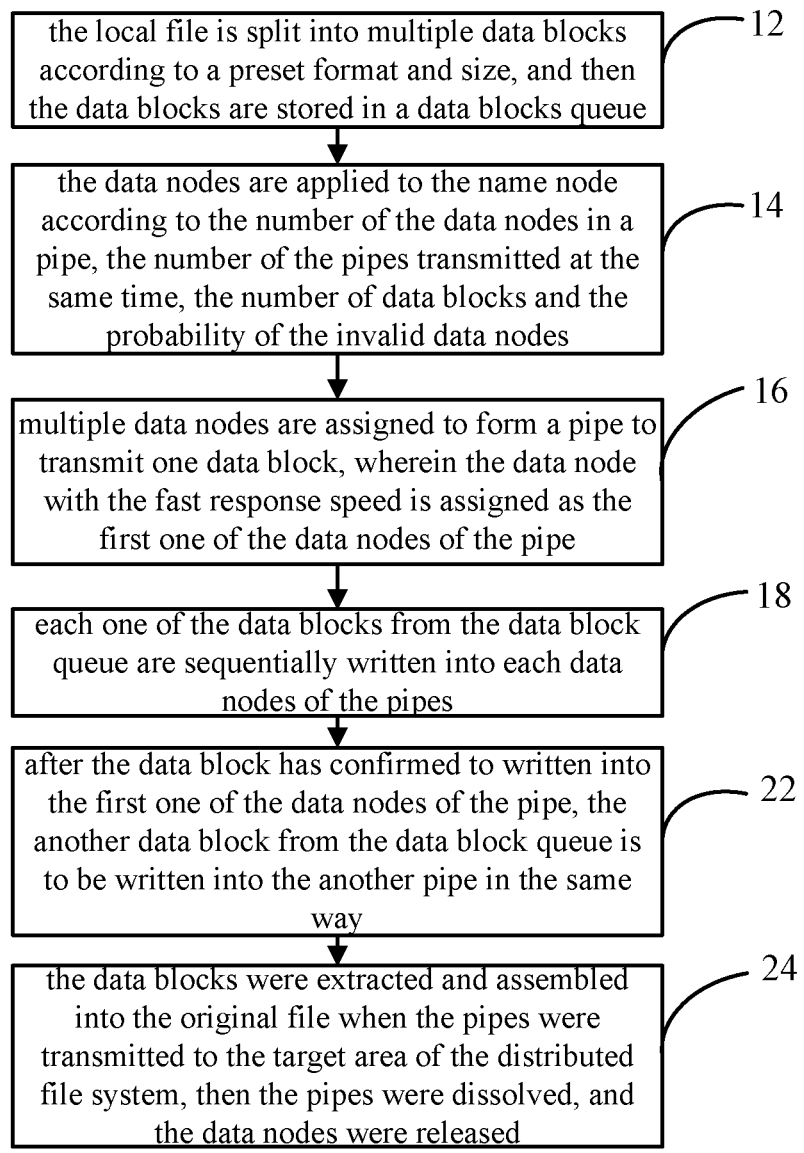
FIG. 5 illustrates a flowchart of an exemplary embodiment of a distributed storage method.

FIG. 5 illustrates a flowchart of an exemplary embodiment of a distributed storage method. The distributed storage method applied in the distributed storage system, the processes of the distributed storage method is described as following.

At block 12, the local file 2 is split into multiple data blocks according to a preset format and size, and then the data blocks are stored in a data blocks queue.

At block 14, an appropriate number of data nodes are applied to the name node 20. And the number of the data nodes applied is determined by the number of the data nodes in a pipe, the number of pipes transmitted simultaneously, the number of data blocks and the probability of invalid data nodes, wherein the probability of invalid data nodes is counted according to the transmission record history which recorded the response time of each of the data nodes. In particular, the number of the data nodes in the pipe is specified by the distributed file system, and the maximum number of the pipes transmitted simultaneously is set according to the transmission bandwidth.

At block 16, multiple data nodes are assigned to form a pipe to transmit one data block. The process of the data nodes assigning includes assigning of the first one of the data nodes of the pipe and the assigning of the one and except the first one of the data nodes of the pipe. In the exemplary embodiment, the pipe is formed by three data nodes, and the data nodes sequence the firs one of the data nodes, the second one of the data nodes and the third one of the data nodes. The data nodes to be assigned are sorted according to the response speed and stored in a data node queue. Then the first one of the data nodes of the pipe is sequentially selected from the front of a certain interval of the data nodes queue, and the second one and the third one of the data nodes of the pipe were randomly selected outside the front of the interval of the data nodes queue.

At block 18, each of the data blocks from the data block queue are sequentially written into each data nodes of the pipes. Especially, the processes of one data block written into one pipe comprises: the data block from the data block queue is written into the first one of the data nodes of the pipe, and then the data block is written into the second one and the third one of the data nodes of the pipe from the first one of the data nodes of the pipe.

At block 22, after the data block has confirmed to written into the first one of the data nodes of the pipe, the another data block from the data block queue is to be written into the another pipe in the same way. In addition, the data node should be determined invalid when the data node is confirmed failure to be written the data block, then the invalid data node is discarded directly and a new data node is assigned to replace the discarded data node. In particular, the data node sorted in the front of a certain interval of the data node queue is sequentially assigned to replace the discarded data node when the discarded data node is the first one of the data nodes of one pipe, and the data node sorted outside the front of the certain interval of the data node queue is randomly assigned to replace the discarded data node when the discarded data node is the one and except the first one of the data nodes of the pipe.

At block 24, the pipe is to be transmitted when the overall data nodes of the pipe have be written in data block and completed the confirmation of writing. Thus, the pipes loaded the different data blocks from the data block queue were sequentially transmitted to the target area of the distributed file system. And the data blocks were extracted and assembled into the original file when the pipes were transmitted to the target area of the distributed file system. Then the pipes were dissolved, and the data nodes were released.

The detailed description above is the introduction of the present disclosure of a network device and method for network address allocation. Although certain exemplary embodiments of the present disclosure have been specifically described, the present disclosure is not to be construed as being limited thereto. Various changes or modifications may be made to the present disclosure without departing from the scope and spirit of the present disclosure.

What is claimed is:

1. A distributed storage system, applied in a distributed file system, wherein the distributed file system comprises data nodes, the distributed storage system comprises:
   at least one processor;
   a non-transitory storage system coupled to the at least one processor and configured to store one or more programs, wherein the one or more programs are executed by the at least one processor, the one or more programs including instructions for:
   splitting an original file into data blocks;
   storing the data blocks in a data block queue;

assigning multiple data nodes to form a first pipe for transmitting a first data block from the data block queue, and when the first one of the data nodes in the first pipe have been written in the data block, assigning another multiple data node to form a second pipe for transmitting a second data block from the data block queue;

transmitting the pipes when the overall data nodes of the first and second pipes have been written in the first and second data blocks; and reading the first and second data block from the first and second pipes, and when the first and second pipes are transmitted to a target area of the distributed file system, dissolving the first and second pipes to release the overall data nodes.

2. The system as claimed in claim 1, wherein the distributed file system comprises a name node, wherein the one or more programs further include instructions for:

applying the data nodes to the name node;

storing the data nodes in a data node queue; and sorting the data nodes of the data node queue as a range according to the response time, and assigning the data nodes sorted in the front of a certain interval of the range to each of the pipes as the first one of the data nodes in each of the pipes sequentially.

3. The system as claimed in claim 2, wherein the one or more programs further include instructions for:

assigning the data node sorted outside the front of a certain interval of the range to each of the pipes as the one and except the first one of the data nodes in each of the pipes randomly.

4. The system as claimed in claim 2, wherein the number of the data nodes to be applied is determined by the number of the data nodes in a pipe, the number of pipes transmitted simultaneously, the number of data blocks and the probability of invalid data nodes.

5. The system as claimed in claim 1, wherein the number of the data nodes in a pipe is at least 3, and the maximum number of the pipes transmitting simultaneously is set according to the transmission bandwidth.

6. A distributed storage method applied in a distributed file system, wherein the distributed file system comprises data node, the method comprises:

splitting an original file into data blocks;

storing the data blocks in a data block queue;

assigning multiple data nodes to form a first pipe for transmitting a first data block from the data block queue, and when the first one of the data nodes in the first pipe have been written in the data block, assigning another multiple data node to form a second pipe for transmitting a second data block from the data block queue;

transmitting the pipes when the overall data nodes of the first and second pipes have been written in the first and second data blocks; and reading the first and second data block from the first and second pipes, and when the first and second pipes are transmitted to a target area of the distributed file system, dissolving the first and second pipes to release the overall data nodes.

7. The method as claimed in claim 6, the distributed file system comprises a name node, wherein assigning multiple data nodes comprises:

applying the data nodes to the name node;

storing the data nodes in a data node queue; and sorting the data nodes of the data node queue as a range according to the response time, and assigning the data nodes sorted in the front of a certain interval of the range to each of the pipes as the first one of the data nodes in each of the pipes sequentially.

8. The method as claimed in claim 7, wherein assigning multiple data nodes further comprises:

assigning the data nodes sorted outside the front of a certain interval of the range to each of the pipes as the one and except the first one of the data nodes in each of the pipes randomly.

9. The method as claimed in claim 7, wherein the number of the data nodes to be applied is determined by the number of the data nodes in a pipe, the number of pipes transmitted simultaneously, the number of data blocks and the probability of invalid data nodes.

10. The method as claimed in claim 6, wherein the number of the data nodes in a pipe is at least 3, and the maximum number of the pipes transmitting simultaneously is set according to the transmission bandwidth.

* * * * *